United States Patent [19]

Flannigan

[11] 4,451,390
[45] May 29, 1984

[54] COMPOSITIONS FOR THE CONTROL OF UNWANTED FOAM AND THEIR USE

[75] Inventor: William T. Flannigan, Lancashire, England

[73] Assignee: Imperial Chemical Industries Inc., London, England

[21] Appl. No.: 390,772

[22] Filed: Jun. 21, 1982

[30] Foreign Application Priority Data

Sep. 30, 1981 [GB] United Kingdom ............... 8129520

[51] Int. Cl.$^3$ ............................................. B01D 19/04
[52] U.S. Cl. .................................... 252/321; 162/173; 162/179; 252/358; 435/812
[58] Field of Search ................. 252/321, 358; 435/812

[56] References Cited

U.S. PATENT DOCUMENTS

| | | | |
|---|---|---|---|
| 2,346,928 | 4/1944 | Lighthipe | 252/321 X |
| 2,373,951 | 4/1945 | Evans et al. | 252/321 X |
| 2,550,450 | 4/1951 | Brown et al. | 252/321 X |
| 2,762,780 | 9/1956 | Kulakow | 252/321 |
| 2,963,403 | 12/1960 | Hiestand | 252/321 X |
| 3,076,768 | 2/1963 | Boylan | 252/321 X |
| 4,028,218 | 6/1977 | Fink et al. | 252/321 |

FOREIGN PATENT DOCUMENTS

| | | | |
|---|---|---|---|
| 954209 | 4/1964 | United Kingdom | 252/321 |
| 1296308 | 11/1972 | United Kingdom | 252/358 |

*Primary Examiner*—Richard D. Lovering
*Attorney, Agent, or Firm*—Cushman, Darby & Cushman

[57] ABSTRACT

A composition for the control of unwanted foaming comprising
(a) Soya bean oil
(b) a mineral oil
(c) a finely divided silica
(d) an unsubstituted fatty acid monoester of glycerol
(e) an unsubstituted fatty acid ester of a polyoxyalkylated sorbitan.

These compositions are valuable for the control of foam especially in fermentations since they are stable to sterilization.

Also they may be used in paints since they do not give the defects often associated with silicone antifoams.

6 Claims, No Drawings

COMPOSITIONS FOR THE CONTROL OF UNWANTED FOAM AND THEIR USE

This invention relates to compositions for the control of unwanted foam.

The problems consequent on unwanted frothing and foaming during a wide range of processes are well known. Extensive foam formation can result in loss of valuable product, reduction in the usable volume in process vessels and effluent problems. Many solutions have been proposed and a common method is to add a small amount of a material antagonistic to the stability of the foam which ideally serves to both break existing foam (defoaming) and to inhibit the formation of fresh foam (antifoaming).

Antifoaming/defoaming agents must fulfil several criteria to be fully satisfactory in commercial use. They must show activity at low concentrations and any residue carried into the final product must not adversely effect its quality and acceptability e.g. the spreading and adhesion of paints and bonding agents must not be impaired and food and drugs must be pure, safe and in the former case free from unwanted flavours. Even at the low levels many antifoaming agent are employed it is desirable that their cost is as low as possible in view of the enormous scale of many processes. Also it is very desirable that the agents do not lose activity when exposed to the conditions of temperature, pH etc. necessary for the process whose foaming is to be controlled.

The agents employed include various mineral and vegetable oils which are relatively cheap but in many instances are of limited efficiency in breaking and preventing foams. Silicone fluids i.e. organo polysiloxanes especially dimethylpolysiloxane fluids have been widely used since their relatively high cost is often more than offset by a high level of activity enabling them to be used in very small quantities.

The activity of the liquid/low melting organic antifoaming agents is commonly enhanced in one or both of two ways.

Firstly a finely divided solid such as silicas of high surface area can be incorporated. These solids are often treated to increase the hydrophobicity of their surface. They are usually used as a minor proportion e.g. a few percent by weight of the liquid/low melting organic agent.

Secondly for use in aqueous systems, an emulsifying agent is mixed with the other components to aid their distribution through the material whose foaming is to be controlled. To further assist the controlled addition and distribution of the small quantities of agent they are often converted to an emulsion in water and it is this emulsion which is added to the material whose foaming is to be controlled. For example see U.K. Ser. No. 954,209.

It has been proposed to use as antifoaming compositions mixtures of mineral and/or vegetable oils with silicone fluids and finely divided solids e.g. see U.K. Pat. No. 1,296,308 and U.S. Pat. No. 4,028,218. This offers the potential advantage of partially replacing expensive silicone fluid by cheaper oils but problems can arise. For example the various components of the mixtures may be difficult to maintain in a homogeneous condition before use.

We have now found a new combination of mineral and vegetable oils with high surface area solid and surface active compounds which has surprisingly high antifoam/defoam activity in a wide range of situations. The new combination often shows good cost effectiveness and is relatively free of contamination problems in comparison with known compositions especially those containing silicone components.

According to the present invention there is provided a composition for the control of unwanted foaming comprising
 (a) Soya bean oil
 (b) a mineral oil
 (c) a finely divided silica
 (d) an unsubstituted fatty acid monoester of glycerol
 (e) an unsubstituted fatty acid ester of a polyoxyalkylated sorbitan.

The mineral oil (b) may be any of a wide range of petroleum products including lower fractions providing they are not unduly volatile and some products totally or partially solid at room temperature. However the preferred materials are relatively unvolatile oils e.g. liquid paraffin, lubricating oils, spindle oil and products available under the trade mark "RISELLA".

The finely divided silica to serve as component (c) may be any of the silicas known for use in foam control composition. Such silicas usually have high surface area e.g. greater than 50 sq. meters per gram. Preferred materials are silicas which are surface treated to increase their hydrophobic character. Commonly used surface treatments involve exposure to reactive organo silicon compounds such as trimethyl chlorsilane or hexamethyl disilazane or heating with organo polysiloxanes.

Unsubstituted fatty acid mono esters of glycerol to provide component (d) may be for example from any suitable $C_{8-24}$ fatty acid e.g. stearic, palmitic, lauric or especially oleic acid. Mixed fatty acids may be used and it will be appreciated that commercially available mono esters will contain a minor proportion of other species such as di- and tri-esters.

The term "unsubstituted" means the fatty acid radical is free from substituent groups such as OH, Cl or amino. It does not exclude alkyl substituents i.e. both linear and branched chain fatty acids are included. Linear acids available from natural oils and fats are usually preferred.

The unsubstituted fatty acid esters of polyoxyalkylated sorbitan to serve as component (e) may be derived from similar fatty acids to those used to form component (d). The polyoxyalkylated sorbitan will typically be the reaction product of sorbitan with 2–50 especially 4–20 moles of one or more alkylene oxides which will usually be largely or entirely ethylene oxide.

Commonly preferred esters are mono-, di- or tri-esters. Suitable products are available under the trade mark "TWEEN".

The preferred amounts by weight of the various components in 100 parts by weight of total composition are
 (a) 20–60 especially 30–50 parts
 (b) 15–50 especially 15–30 parts
 (c) 1–10 especially 2–6 parts
 (d) 5–25 especially 10–20 parts
 (e) 3–20 especially 5–15 parts.

Naturally the relative amounts of the various components will usually be such that each can fall within the preferred ranges and it is usually found that the amounts by weight in 100 parts by weight of total composition of (a)+(b) falls in the range 50 to 75 and (d)+(e) in the range 15 to 35.

The compositions of the present invention may be made by mixing the components in any convenient order. In some instances it may be advantageous to wet out the solid component (c) with a small quantity of one of the liquid components before adding to the bulk of the liquid components. Mechanical agitation may also be desirable to effect uniform dispersion of the components.

The composition of the present invention may be used to control unwanted foaming in a wide range of industrial processes and products e.g. in fermentations such as the production of alcohol for example in brewing and in the microbiological production of antibiotics and protein feedstuffs; in wood pulping and in water based paints.

The amount of the composition of the present invention used will be determined by experience for each situation and will be the minimum necessary to achieve the desired effect. Typically this will be from 1 to 100 ppm.

The compositions of the present invention do not usually form stable emulsions in water so this cannot be used to help in the dosing of the small amounts required.

The compositions of the present invention show many desirable features and are often surprisingly effective in comparison with known compositions in a wide range of foaming systems. They may be sterilised in an autoclave without serious loss of activity and they frequently have little influence on microbiological activity. When used in water based paints they do not produce defects in the coated film even at high concentrations. This contrasts with silicone products which often lead to film defects such as cissing and "fish-eyes".

The compositions of the present invention often show activity in preventing foam and also in rapidly collapsing a foam which had already formed.

The invention is illustrated by the following Examples in which parts are by weight unless otherwise indicated.

EXAMPLES 1-4

The following compositions were prepared by mixing the components with a simple mechanical stirrer.

| Example | 1 | 2 | 3 | 4 |
| --- | --- | --- | --- | --- |
| Soya Bean Oil | 40 | 55 | 55 | 25 |
| Liquid paraffin BPC | 30 | 15 | — | 30 |
| RISELLA Oil 33 | — | — | 15 | — |
| Hydrophobised pyrogenic silica surface area 300 m$^2$/g | 5 | 5 | 5 | 5 |
| Glyceryl monooleate | 15 | 15 | 15 | 24 |
| Polyoxyethylene (20) sorbitan monolaurate | 10 | 10 | 10 | 16 |

The above compositions remain fluid and uniformly dispersed on storage.

For comparative tests the following compositions were prepared.

Composition A (Formulation B in Example 6 of U.S. Pat. No. 4,028,218.)

| Soya Bean Oil | 70 |
| --- | --- |
| White Oil 5° E | 15 |
| Oxyethylated fatty alcohol mixture HLB value 10 (BRYJ 30) | 7.5 |
| Pyrogenic silica surface area 150 m$^2$/g | 3 |
| Dimethylsiloxane fluid F111/50 | 4.5 |

Composition B

As Example 1 using RISELLA Oil 33 in place of liquid paraffin BPC and glyceryl monoricinoleate in place of glyceryl monooleate.

Compositions W-Z

|  | W | X | Y | Z |
| --- | --- | --- | --- | --- |
| Soya Bean Oil | 55 | 55 | 55 | 55 |
| Liquid Paraffin BPC | 30 | 30 | 30 | 30 |
| Hydrophobised pyrogenic silica 300 m$^2$/g | 5 | 5 | 5 | 5 |
| Glyceryl monooleate | 10 |  |  |  |
| Polyoxyethylene (20) sorbitan monolaurate |  | 10 |  |  |
| Polyoxyethylene (20) sorbitan monostearate |  |  | 10 |  |
| Polyoxyethylene (20) sorbitan tristearate |  |  |  | 10 |

Composition W forms crystals on storage and X, Y and Z separate on storage.

The above materials were evaluated for antifoam activity and paint films behaviour in the following tests.

Antifoam Activity Test with Corn Steep Liquor.

Apparatus:

A 1 liter 3-necked round bottomed flask was modified as follows. The centre neck was replaced by a tube of 5 cm diameter and total volume 2.2 liters. This tube was graduated in 10 ml divisions. The other two necks are replaced by removable injection caps.

A sintered glass disc of porosity 3 and diameter 2.5 cm was fused into the base of the flask and a glass dome with stop-cock was fused over the disc. A tube from the stop-cock was connected to an air supply via a needle valve and flow meter.

Foaming medium:

A fresh solution of corn steep liquor was prepared daily consisting of 150 g of Corn Steep Liquor per liter of deionised water.

1 liter of this fresh diluted corn steep liquor solution was used in each test.

Procedure:

The antifoam under test was placed in a 1 cc syringe and using the syringe 10 drops of the antifoam under test were placed in a tared aluminium dish, reweighed and the weight of 1 drop of antifoam noted.

Typically the weight of one drop of antifoam was 8 milligrammes.

1 liter of diluted corn steep liquor was charged to the round bottomed flask of the bubbler apparatus and the flask and contents placed in a thermostatically controlled water bath at 25° C. for 30 minutes.

3 drops of antifoam under test (i.e. 24 mg/l) were added and the air supply set at 625 cc/minute. The time taken for the foam to rise was noted at each 100 ml interval.

Before each foam test a blank was run in the absence of added antifoam. This checks the foaming properties of the corn steep liquor which tends to be variable and the cleanliness of the equipment.

The table below summarises the results of a series of tests on Examples 1-4 and various comparative compositions.

| Foam Volume (ml) | FOAM RISE TIME (Seconds) | | | | | | | | | | |
|---|---|---|---|---|---|---|---|---|---|---|---|
| | Blank | A | Ex. 1 | Ex. 2 | B | Ex. 3 | Ex. 4 | W | X | Y | Z |
| 0 | 0 | 0 | 0 | 0 | 0 | 0 | 0 | 0 | 0 | 0 | 0 |
| 100 | 10 | 59 | 117 | 88 | 68 | 28 | 27 | 41 | 10 | 10 | 11 |
| 200 | 15 | 87 | 196 | 241 | 94 | 170 | 147 | 121 | 14 | 21 | 15 |
| 300 | 20 | 121 | 252 | 384 | 126 | 246 | 308 | 190 | 39 | 30 | 22 |
| 400 | 28 | 148 | 346 | 461 | 164 | 403 | 529 | 243 | 53 | 40 | 35 |
| 500 | 35 | 171 | 362 | 534 | 207 | 532 | 766 | 280 | 67 | 55 | 46 |
| 600 | 42 | 194 | 561 | 641 | 256 | 700 | 1111 | 311 | 83 | 65 | 57 |
| 700 | 50 | 261 | 663 | 773 | 300 | 860 | 1278 | 375 | 96 | 73 | 70 |
| 800 | 55 | 249 | 783 | 833 | 355 | 1072 | 1469 | 425 | 104 | 83 | 83 |
| 900 | 65 | 277 | 6968 | 964 | 409 | 1160 | 1700 | 475 | 116 | 95 | 101 |
| 1000 | 70 | 300 | 1043 | 1108 | 471 | 1310 | 2091 | 550 | 124 | 105 | 113 |

A further set of tests carried out at a different time compared Example 3 with a commercially available silicone antifoam in the form of a 20% aqueous emulsion.

| | Foam Rise Time (seconds) | |
|---|---|---|
| Foam volume | Example 3 (24 mg/liter) | Silicone emulsion (120 mg/liter) |
| 100 | 264 | 23 |
| 200 | 513 | 59 |
| 300 | 923 | 210 |
| 400 | Foam did not reach | Foam did not reach |

Evaluation in Paint

The following paint base was prepared by adding the ingredients in the order shown using a high shear mixer followed by adding the acrylic latex using a slow paddle stirrer.

| | Parts/100 parts by weight |
|---|---|
| Water | 10.90 |
| Sodium carboxymethyl cellulose (2.5% solution) | 17.07 |
| Surfactant (nonylphenol/ ethylene oxide) | 0.03 |
| Calgon S | 0.12 |
| Barytes | 3.67 |
| China clay | 8.70 |
| Tioxide RXL | 26.70 |
| Acrylic latex (EMULTEX AC43) | 32.81 |

The base was split into 10 equal portions and treated as follows.

a. No antifoam added.
b. 200 ppm of commercial 20% silicone antifoam emulsion.
c. 100 ppm of commercial 20% silicone antifoam emulsion.
d. 50 ppm of commerical 20% silicone antifoam emulsion.
e. 400 ppm of commercial 10% silicone antifoam emulsion.
f. 200 ppm of commercial 10% silicone antifoam emulsion.
g. 200 ppm of Formulation given in Example 2.
h. 1000 ppm of Formulation given in Example 2.
j. 10,000 ppm of Formulation given in Example 2.

Each paint formulation was tested by brushing onto a sheet of degreased polyester film and onto a clean smooth plywood surface. The paint was observed during application, drying and as a dry paint film with the following results.

a. Very bad bubbling during application. Poor rough film.
b. Bad cissing and excessive fish-eyed coating.
c. Slight cissing and fish-eyes when dry.
d. Similar to a during application and when dry.
e. Same as b.
f. Similar to c.
g. Excellent smooth coating with good application characteristics.
h. Excellent smooth coating even better than g.
j. Excellent—indistinguishable from h.

Evaluation in Wood Pulping Black Liquor Foam Control.

The amount of antifoam composition required to destroy foam formed by mechanically frothing a dilute black liquor taken from a Kraft process mill was determined using 1 liter of the dilute highly alkaline liquor at 70° C.

| Antifoam | Volume Required to Control Foam |
|---|---|
| Commercial mineral oil/ amide product | 0.15 ml |
| Mineral oil | 0.95 ml |
| Example 2 | 0.08 ml |
| Example 3 | 0.09 ml |

EXAMPLES 5-8

The compositions of Examples 1-4 were repeated replacing hydrophobised pyrogenic silica of surface area 300 m²/g by an equal weight of a similar silica of surface area 150 m²/g. The resulting compositions were found to have similar, but marginally lower, activity than the corresponding compositions of Examples 1-4.

EXAMPLES 9-12

The compositions of Examples 1-4 were repeated replacing the polyoxyethylene (20) sorbitan monolaurate with an equal weight of polyoxyethylene (20) sorbitan monostearate. The resulting compositions had essentially identical activity with corresponding compositions of Examples 1-4.

I claim:

1. A composition for the control of unwanted foaming comprising in percent by weight:
    (a) 20-60% Soya bean oil,
    (b) 15-50% mineral oil,
    (c) 1-10% finely divided silica,
    (d) 5-25% unsubstituted fatty acid monoester of glycerol, and
    (e) 3-20% unsubstituted fatty acid ester of a polyoxyalkylated sorbitan.

2. A composition as claimed in claim 1 wherein the finely divided silica (c) has a surface area of at least 50 sq. meters per gram.

3. A composition as claimed in claim 1 or 2 which has mono glyceryl stearate, palmitate, laurate or oleate as component (d).

4. A composition as claimed in claim 1 in which the polyoxyalkylated sorbitan of component (e) is the reaction product of sorbitan with 2–50 moles of ethylene oxide.

5. A process for the control of unwanted foam which comprises incorporating a composition as claimed in claim 1 in the material generating the unwanted foam.

6. A process as claimed in claim 5 wherein the amount of composition incorporated is from 1 to 100 ppm of the material generating the unwanted foam.

* * * * *